(12) United States Patent
Suzuki et al.

(10) Patent No.: US 9,167,271 B2
(45) Date of Patent: Oct. 20, 2015

(54) IMAGE PROCESSING DEVICE, METHOD, AND PROGRAM, DYNAMIC IMAGE ENCODING DEVICE, METHOD, AND PROGRAM, DYNAMIC IMAGE DECODING DEVICE, METHOD, AND PROGRAM, AND ENCODING/DECODING SYSTEM AND METHOD

(75) Inventors: Yoshinori Suzuki, Saitama (JP); Choong Seng Boon, Yokohama (JP); Thiow Keng Tan, Singapore (SG)

(73) Assignee: NTT DOCOMO, INC., Tokyo (JP)

( * ) Notice: Subject to any disclaimer, the term of this patent is extended or adjusted under 35 U.S.C. 154(b) by 978 days.

(21) Appl. No.: 13/081,326

(22) Filed: Apr. 6, 2011

(65) Prior Publication Data
US 2011/0228841 A1 Sep. 22, 2011

Related U.S. Application Data

(63) Continuation of application No. PCT/JP2009/065852, filed on Sep. 10, 2009.

(30) Foreign Application Priority Data

Oct. 7, 2008 (JP) .................................. 2008-260717

(51) Int. Cl.
*H04N 19/86* (2014.01)
*H04N 19/117* (2014.01)
*H04N 19/14* (2014.01)
*H04N 19/182* (2014.01)
*H04N 19/82* (2014.01)

(52) U.S. Cl.
CPC .............. *H04N 19/86* (2014.11); *H04N 19/117* (2014.11); *H04N 19/14* (2014.11); *H04N 19/182* (2014.11); *H04N 19/82* (2014.11)

(58) Field of Classification Search
None
See application file for complete search history.

(56) References Cited

U.S. PATENT DOCUMENTS

| 5,367,385 | A  | * | 11/1994 | Yuan ............................. 358/465 |
| 5,786,857 | A  |   | 7/1998  | Yamaguchi |
| 6,134,518 | A  |   | 10/2000 | Cohen et al. |
| 6,539,120 | B1 | * | 3/2003  | Sita et al. ....................... 382/233 |

(Continued)

FOREIGN PATENT DOCUMENTS

| EP | 1 164 799 A1 | 12/2001 | |
| JP | 02-057067 | 2/1990 | ............. H04N 1/415 |

(Continued)

OTHER PUBLICATIONS

Extended European Search Report for European Application No. 09819070.5, dated Dec. 4, 2012, 10 pages.

(Continued)

*Primary Examiner* — Frederick Bailey
(74) *Attorney, Agent, or Firm* — Brinks Gilson & Lione

(57) ABSTRACT

In order to preserve edges of a picture and to suppress a residual distorted signal in a reproduced picture, a picture processing device (in-loop filter) includes a first filter unit for applying a first filter to an input picture to generate a first filter picture, an attribute information generator which generates an attribute value indicating whether or not to apply a second filter to each pixel of the generated first filter picture, and a second filter unit for applying the second filter to a target pixel of the first filter picture selected on the basis of the attribute value of each pixel of the generated first filter picture, to generate a second filter picture.

23 Claims, 15 Drawing Sheets

(56) References Cited

U.S. PATENT DOCUMENTS

| | | | |
|---|---|---|---|
| 2002/0141503 A1 | 10/2002 | Kobayashi et al. | |
| 2006/0153301 A1 | 7/2006 | Guleryuz | 375/240.16 |
| 2007/0047021 A1* | 3/2007 | Hu et al. | 358/463 |
| 2007/0110329 A1 | 5/2007 | Moon et al. | |
| 2007/0140355 A1* | 6/2007 | Uchida et al. | 375/240.24 |
| 2007/0140574 A1* | 6/2007 | Yamaguchi et al. | 382/233 |
| 2008/0291287 A1* | 11/2008 | Dvir | 348/222.1 |
| 2011/0116549 A1* | 5/2011 | Sun | 375/240.16 |

FOREIGN PATENT DOCUMENTS

| | | | | |
|---|---|---|---|---|
| JP | 2002-344968 | 11/2002 | | H04N 7/30 |
| JP | 2007-166522 | 6/2007 | | H04N 7/30 |
| WO | WO 2007/026274 A2 | 3/2007 | | |
| WO | WO 2008/057308 A2 | 5/2008 | | |

OTHER PUBLICATIONS

International Preliminary Report on Patentability for International Application No. PCT/JP2009/065852, dated May 17, 2011, 9 pages.

International Search Report for International Application No. PCT/JP2009/065852, dated Dec. 15, 2009, 4 pages.

Neuendorf, M., Lecomte, J., Multrus, M., Bayer, S., Nagel, F., Fuchs, G., "Proposed Corrections to WD and Reference Software on Unified Speech and Audio Coding," Feb. 2-6, 2009, pp. 1-39, 87. MPEG Meeting, ISO/IEC JTC1/SC29/WG11, MPEG2009/M16153, Lausanne, Switzerland.

Canadian Office Action, dated Jul. 10, 2014, pp. 1-3, issued in Canadian Patent Application No. 2,754,404, Canadian Intellectual Property Office, Gatineau, Quebec.

Taiwan Search Report, dated Jul. 2, 2015, pp. 1-12, issued in Taiwan Patent Application No. 098133602, Taiwan Intellectual Property Office, Taipei City, Taiwan, R.O.C.

* cited by examiner

IMAGE PROCESSING DEVICE, METHOD, AND PROGRAM, DYNAMIC IMAGE ENCODING DEVICE, METHOD, AND PROGRAM, DYNAMIC IMAGE DECODING DEVICE, METHOD, AND PROGRAM, AND ENCODING/DECODING SYSTEM AND METHOD This application is a continuation of PCT/JP2009/065852, filed Sep. 10, 2009, which claims the benefit of the filing date under 35 U.S.C. §119(e) of JP2008-260717, filed Oct. 7, 2008, both of which are incorporated herein by reference.

TECHNICAL FIELD

The present invention relates to a picture processing device, method, and program which process a moving picture, to a moving picture encoding device, method, and program which remove a residual distorted signal of a reproduced picture handled in encoding a moving picture, and to a moving picture decoding device, method, and program which remove a residual distorted signal of a reproduced picture in decoding a moving picture. The present invention also relates to an encoding/decoding system and method which performs encoding and decoding.

BACKGROUND ART

A compression encoding technique is used so as to efficiently transmit or accumulate moving picture data. In the case of a moving picture; the MPEG1, 2, and 4 or H.261 to H.264 systems are widely used.

In order to improve the encoding efficiency, a target picture is divided into a plurality of target blocks, and then a predictive encoding/decoding process is performed. Specifically, a picture for one frame is divided into target blocks of 16×16 pixels. In the case of an intra-frame predictive encoding method, a predicted signal is generated using an adjacent picture signal (reproduced or uncompressed from compressed picture data) which resides in the frame in which a target block to be encoded resides and is subtracted from the target block to obtain a difference signal which is then encoded.

Instead of the intra-frame predictive encoding method, an inter-frame predictive encoding method may be used (in which a predicted signal of a target block is generated, using another frame adjacent on the time axis in a moving picture, and the difference between the predicted signal and the target block is encoded). In this case, a motion detection is carried out for the target block using uncompressed encoded frames as reference pictures. A predicted signal with the minimum error is then determined, and a difference value between the determined predicted signal and the target block is obtained.

Next, discrete cosine transform and quantization processes are performed on the difference signal obtained by the intra-frame predictive encoding method or the inter-frame predictive encoding method. The quantized coefficients of discrete cosine transform and the motion vectors or mode information for specifying the predicted signal are entropy-encoded to generate encoded data.

Data encoded in the above-described manner is uncompressed and reproduced so as to obtain a predicted signal of a next target block. The reproduced picture is stored as a reference picture in a frame memory after distortion caused by encoding is removed by means of in-loop filter processing.

The in-loop filter may be a known block distortion removing filter which removes a block distortion between blocks. However, the block distortion removing filter has a problem in that the filter is prone to generate an out-of-focus picture. Meanwhile, below-described Patent Literature 1 discloses a filtering process which removes noise near edges in a reproduced picture. According to the method of Patent Literature 1, since the filtering process is performed so as not to cross over the edges of an object within a picture, it is effective to clear the impressions of the entire picture while preserving the edges.

CITATION LIST

Patent Literature

Patent Literature 1 is U.S. Patent Publication No. 2006/0153301.

However, since the filtering process of Patent Literature 1 is a process for preserving edges, it causes a problem in that there are distortions unable to be removed. In particular, block distortion is likely to occur in the form of ghost contours appearing in a stepwise manner. Such a residual distorted signal can be suppressed by the application of a low-pass filter over the entire picture. However, if a low-pass filter is applied randomly over the entire picture, the edges of a picture would be distorted.

SUMMARY OF THE INVENTION

The invention has been made in order to solve the above-described problems, and an object of the invention is to suppress a residual distorted signal of a reproduced picture while preserving the original edges of a picture.

In order to achieve the above-described object, the present invention provides a picture processing device. The picture processing device includes a first filter unit for applying a first filter to an input picture to generate a first filter picture, an attribute information generation unit for generating an attribute value indicating whether or not to apply a second filter to each pixel of the first filter picture generated by the first filter unit, and a second filter unit for applying the second filter to a target pixel of the first filter picture selected on the basis of the attribute value of each pixel of the first filter picture generated by the attribute information generation unit, to generate a second filter picture.

The picture processing device of the present invention may further include a filter picture selection unit for comparing the first filter picture with the second filter picture to obtain a difference value of each pixel. The unit then selects and outputs a pixel of the first filter picture which has the difference value equal to or greater than a predefined threshold value, and selects and outputs a pixel of the second filter picture which has the difference value smaller than the threshold value.

In the picture processing device according to the present invention, the second filter unit may be configured to select a target pixel of the first filter picture as a pixel of the second filter picture to be generated, when a value which is calculated from the attribute value for the target pixel of the first filter picture and the attribute values for a predetermined number of pixels adjacent to the target pixel is greater than a predetermined value.

In the picture processing device according to the present invention, the second filter may be a one-dimensional filter, and the second filter unit may be configured to apply the second filter to a target pixel of the first filter picture in one of a horizontal direction and a vertical direction and then to apply the second filter to the target pixel of the first filter picture in the other direction.

In the picture processing device according to the present invention, the second filter may have 15 taps expressed by {1,1,1,1,1,1,1,2,1,1,1,1,1,1,1}/16, and the second filter unit may be configured to apply the second filter to a target pixel while referring to 15 pixels which includes the target pixel and seven adjacent pixels located on each of the immediate left and immediate right of the target pixel or 15 pixels which includes the target pixel and seven adjacent pixels located on each of the immediate top and immediate bottom of the target pixel.

In the picture processing device according to the present invention, when the first filter is a filter which references pixels in a range surrounded by M pixels in the vicinity of a target pixel, the second filter may be constituted by a filter which references pixels in a range surrounded by L pixels in the vicinity of a target pixel, wherein L is greater than M.

The present invention can be regarded as directed to a picture processing method and a picture processing program and can be described as follows:

The present invention also provides a picture processing method which is executed by a picture processing device. The picture processing method includes a first filter step of applying a first filter to an input target picture to generate a first filter picture, an attribute information generation step of generating an attribute value indicating whether or not to apply a second filter to each pixel of the first filter picture generated by the first filter step, and a second filter step of applying the second filter to a target pixel of the first filter picture selected on the basis of the attribute value of each pixel of the first filter picture generated by the attribute information generation step, to generate a second filter picture.

The picture processing method of the present invention may further include a filter picture selection step of comparing the first filter picture with the second filter picture to obtain a difference value of each pixel. The method selects and outputs a pixel of the first filter picture which has the difference value equal to or greater than a predefined threshold value, and selects and outputs a pixel of the second filter picture which has the difference value smaller than the threshold value.

The present invention also provides a non-transitory storage medium storing a picture processing program. The picture processing program causes a computer provided in a picture processing device to function as a first filter unit for applying a first filter to an input picture to generate a first filter picture, an attribute information generation unit for generating an attribute value indicating whether or not to apply a second filter to each pixel of the first filter picture generated by the first filter unit, and a second filter unit for applying the second filter to a target pixel of the first filter picture selected on the basis of the attribute value of each pixel of the first filter picture generated by the attribute information generation unit, to generate a second filter picture.

The storage medium according to the present invention stores a picture processing program which may cause the computer to further function as a filter picture selection unit for comparing the first filter picture with the second filter picture to obtain a difference value of each pixel. The computer then selects and outputs a pixel of the first filter picture which has the difference value equal to or greater than a predefined threshold value, and selects and outputs a pixel of the second filter picture which has the difference value smaller than the threshold value.

According to the invention described above, it is possible to suppress a residual distorted signal in a reproduced picture while preserving edges in a picture.

According to the present invention, the moving picture encoding device, method, and program is applied, thereby improving the accuracy of the encoding process. Similarly, according to the present invention, the moving picture decoding device, method, and program is applied, thereby improving the accuracy of the decoding process.

A moving picture encoding device, method, and program to which the present invention is applied can be described as follows:

The present invention provides a moving picture encoding device. The moving picture encoding device includes a block divider which divides an inputted target picture into a plurality of blocks, a prediction signal generator which generates, for a target block, a prediction signal and side information including at least information regarding a prediction method, a subtracter which subtracts the generated prediction signal from the signal of the target block to generate a residual signal, a transformer which transforms the residual signal of the target block to transform coefficients in a frequency domain, a quantizer which compresses the transform coefficients through a quantization process to obtain quantized transform coefficients, a de-quantizer which de-quantizes the quantized transform coefficients to restore transform coefficients, an inverse transformer which inverse-transforms the restored transform coefficients to reproduce a residual signal, an adder which adds the residual signal reproduced by the inverse transformer and the prediction signal to restore a reproduced picture, an in-loop filter which includes the above-described picture processing device and performs a filtering process for removing an unnecessary distortion from the reproduced picture using the side information and information of the quantized transform coefficients, a frame memory which stores the reproduced picture after the filtering process, and an entropy encoder which entropy-encodes the information of the quantized transform coefficients and the side information, and outputs the entropy-encoded information in the form of a bitstream.

The invention also provides a moving picture encoding method which is executed by a moving picture encoding device. The moving picture encoding method includes the steps of dividing an inputted target picture into a plurality of blocks, generating, for a target block, a prediction signal and side information including at least information regarding a prediction method, subtracting the generated prediction signal from the signal of the target block to generate a residual signal, transforming the residual signal of the target block to transform coefficients in a frequency domain, compressing the transform coefficients through a quantization process to obtain quantized transform coefficients, de-quantizing the quantized transform coefficients to restore transform coefficients, inverse-transforming the transform coefficients to reproduce a residual signal, adding the residual signal reproduced by the inverse transformer and the prediction signal to restore a reproduced picture, operating an in-loop filter including the above-described picture processing device to perform a filtering process for removing an unnecessary distortion from the reproduced picture using the side information and information of the quantized transform coefficients, storing the reproduced picture after the filtering process, and entropy-encoding the information of the quantized transform coefficients and the side information, and outputting the entropy-encoded information in the form of a bitstream.

The present invention provides a storage medium storing a moving picture encoding program. The moving picture encoding program causes a computer provided in a moving picture encoding device to function as a block divider which divides an inputted target picture into a plurality of blocks, a prediction signal generator which generates, for a target block, a prediction signal and side information including at least information regarding a prediction method, a subtracter which subtracts the generated prediction signal from the signal of the target block to generate a residual signal, a transformer which transforms the residual signal of the target block to transform coefficients in a frequency domain, a quantizer which compresses the transform coefficients through a quantization process to obtain quantized transform coefficients, a de-quantizer which de-quantizes the quantized transform coefficients to restore transform coefficients, an inverse transformer which inverse-transforms the restored transform coefficients to reproduce a residual signal, an adder which adds the residual signal reproduced by the inverse transformer and the prediction signal to restore a reproduced picture, an in-loop filter which includes the above-described picture processing device and performs a filtering process for removing an unnecessary distortion from the reproduced picture using the side information and information of the quantized transform coefficients, a frame memory which stores the reproduced picture after the filtering process, and an entropy encoder which entropy-encodes the information of the quantized transform coefficients and the side information, and outputs the entropy-encoded information in the form of a bitstream.

A moving picture decoding device, method, and program to which the present invention is applied can be described as follows:

The present invention provides a moving picture decoding device. The moving picture decoding device includes a data analyzer which receives a bitstream obtained by entropy-encoding quantized transform coefficients of a residual signal and side information including at least information regarding a prediction method and entropy-decodes the bitstream to obtain the quantized transform coefficients and the side information, a prediction signal generator which generates a prediction signal on the basis of the side information, a de-quantizer which de-quantizes the quantized transform coefficients to obtain transform coefficients, an inverse transformer which inverse-transforms the obtained transform coefficients to restore a residual signal, an adder which adds the prediction signal and the residual signal to generate a reproduced picture, an in-loop filter which includes the above-described picture processing device and performs a filtering process for removing an unnecessary distortion from the reproduced picture using the side information and information of the quantized transform coefficients, and a frame memory which stores the reproduced picture after the filter processing.

The present invention also provides a moving picture decoding method which is executed by a moving picture decoding device. The moving picture decoding method includes the steps of receiving a bitstream obtained by entropy-encoding quantized transform coefficients of a residual signal and side information including at least information regarding a prediction method and entropy-decoding the bitstream to obtain the quantized transform coefficients and the side information, generating a prediction signal on the basis of the side information, de-quantizing the quantized transform coefficients to obtain transform coefficients, inverse-transforming the obtained transform coefficients to restore a residual signal, adding the prediction signal and the residual signal to generate a reproduced picture, operating an in-loop filter including the above-described picture processing device to perform a filtering process for removing an unnecessary distortion from the reproduced picture using the side information and information of the quantized transform coefficients, and storing the reproduced picture after the filtering process.

The invention also provides a storage medium storing a moving picture decoding program. The moving picture decoding program causes a computer provided in a moving picture decoding device to function as a data analyzer which receives a bitstream obtained by entropy-encoding quantized transform coefficients of a residual signal and side information including at least information regarding a prediction method and entropy-decodes the bitstream to obtain the quantized transform coefficients and the side information, a prediction signal generator which generates a prediction signal on the basis of the side information, a de-quantizer which de-quantizes the quantized transform coefficients to obtain transform coefficients, an inverse transformer which inverse-transforms the obtained transform coefficients to restore a residual signal, an adder which adds the prediction signal and the residual signal to generate a reproduced picture, an in-loop filter which includes the above-described picture processing device and performs a filtering process for removing an unnecessary distortion from the reproduced picture using the side information and information of the quantized transform coefficients, and a frame memory which stores the reproduced picture after the filtering process.

The present invention can be described as an encoding/decoding system and an encoding/decoding method as follows:

The invention provides an encoding/decoding system. The encoding/decoding system includes a moving picture encoding device and a moving picture decoding device. The moving picture encoding device includes a block divider which divides an inputted target picture into a plurality of blocks, a prediction signal generator which generates, for a target block, a prediction signal and side information including at least information regarding a prediction method, a subtracter which subtracts the generated prediction signal from the signal of the target block to generate a residual signal, a transformer which transforms the residual signal of the target block to transform coefficients in a frequency domain, a quantizer which compresses the transform coefficients through a quantization process to obtain quantized transform coefficients, a de-quantizer which de-quantizes the quantized transform coefficients to restore transform coefficients, an inverse transformer which inverse-transforms the restored transform coefficients to reproduce a residual signal, an adder which adds the residual signal reproduced by the inverse transformer and the prediction signal to restore a reproduced picture, an in-loop filter which includes the above-described picture processing device and performs a filtering processing for removing an unnecessary distortion from the reproduced picture using the side information and information of the quantized transform coefficients, a frame memory which stores the reproduced picture after the filtering process, and an entropy encoder which entropy-encodes the information of the quantized transform coefficients and the side information, and outputs the entropy-encoded information in the form of a bitstream. The moving picture decoding device includes a data analyzer which receives a bitstream obtained by entropy-encoding quantized transform coefficients of a residual signal and side information including at least information regarding a prediction method and entropy-decodes the bitstream to obtain the quantized transform coefficients and the side information, a prediction signal generator which generates a prediction signal on the basis of the side information, a de-quantizer which de-quantizes the quantized transform coefficients to obtain transform coefficients, an inverse transformer which inverse-transforms the obtained transform coefficients to restore a residual signal, an adder which adds the prediction signal and the residual signal to generate a reproduced picture, an in-loop filter which includes the above-described picture processing device and performs a filtering process for removing an unnecessary distortion from the reproduced picture using the side information and information of the quantized transform coefficients, and a frame memory which stores the reproduced picture after the filtering process.

The present invention also provides an encoding/decoding method which is executed by an encoding/decoding system including a moving picture encoding device and a moving picture decoding device. The encoding/decoding method includes the steps of processing a moving picture encoding method which is executed by the moving picture encoding device, and processing a moving picture decoding method which is executed by the moving picture decoding device. The step of processing the moving picture encoding method includes the steps of dividing an inputted target picture into a plurality of blocks, generating, for a target block, a prediction signal and side information including at least information regarding a prediction method, subtracting the generated prediction signal from the signal of the target block to generate a residual signal, transforming the residual signal of the target block to transform coefficients in a frequency domain, compressing the transform coefficients through a quantization process to obtain quantized transform coefficients, de-quantizing the quantized transform coefficients to restore transform coefficients, inverse-transforming the restored transform coefficients to reproduce a residual signal, adding the residual signal reproduced by the inverse transformer and the prediction signal to restore a reproduced picture, operating an in-loop filter including the above-described picture processing device to perform a filtering process for removing an unnecessary distortion from the reproduced picture using the side information and information of the quantized transform coefficients, storing the reproduced picture after the filtering process, and entropy-encoding the information of the quantized transform coefficients and the side information, and outputting the entropy-encoded information in the form of a bitstream. The step of processing the moving picture decoding method includes the steps of receiving a bitstream obtained by entropy-encoding quantized transform coefficients of a residual signal and side information including at least information regarding a prediction method and entropy-decoding the bitstream to obtain the quantized transform coefficients and the side information, generating a prediction signal on the basis of the side information, de-quantizing the quantized transform coefficients to obtain transform coefficients, inverse-transforming the obtained transform coefficients to restore a residual signal, adding the prediction signal and the residual signal to generate a reproduced picture, operating an in-loop filter including the above-described picture processing device to perform a filtering process for removing an unnecessary distortion from the reproduced picture using the side information and the information of the quantized transform coefficients, and storing the reproduced picture after the filtering process.

According to the invention, it is possible to suppress a residual distorted signal in a reproduced picture while maintaining the original edges of a picture.

DETAILED DESCRIPTION OF THE PREFERRED EMBODIMENTS

Hereinafter, an embodiment of the invention will be described with reference to FIGS. 1 to 13.

(Moving Picture Encoding Device)

Figure 1:
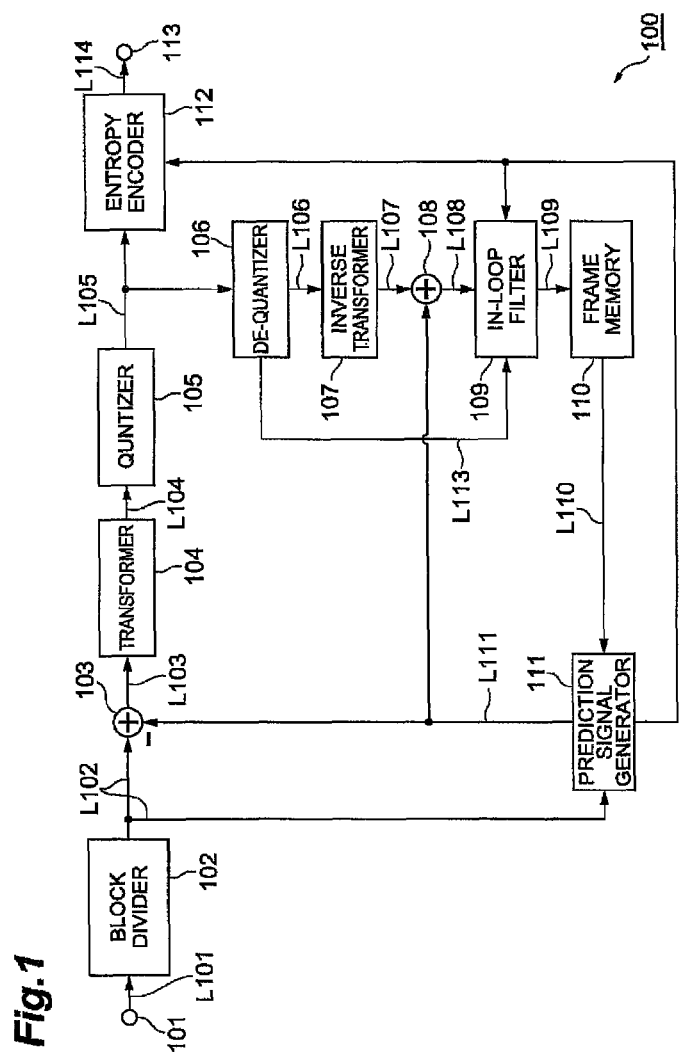
FIG. 1 is a block diagram of a moving picture encoding device according to an embodiment of the present invention.

FIG. 1 is a block diagram showing a moving picture encoding device 100 having a function of removing a residual distorted signal according to the present invention. The moving picture encoding device 100 comprises an input terminal 101, a block divider 102, a subtracter 103, a transformer 104, a quantizer 105, a de-quantizer 106, an inverse transformer 107, an adder 108, an in-loop filter 109, a frame memory 110, a prediction signal generator 111, an entropy encoder 112, and an output terminal 113.

The operation of each constituent part of the moving picture encoding device 100 will be described. A plurality of pictures constituting a moving picture are inputted from the input terminal 101.

The block divider 102 divides an target picture to be encoded into a plurality of small regions (for example, blocks of 8×8 pixels). Each divided block will be subjected to the following compression/encoding process:

The prediction signal generator 111 generates a prediction signal for a target block to be encoded (hereinafter, referred to as "target block") and outputs the generated prediction signal to the subtracter 103 through a line L111. The prediction signal generator 111 executes an intra-frame prediction method or an inter-frame prediction method to generate a plurality of candidate prediction methods, and selects one from the plurality of candidate prediction methods with which an amount of code data necessary to encode the signal of the target block inputted through a line L102 is small, and a residual error from the target block is small. The candidates prediction method are not limiting in the invention. Prediction mode information representing the selected prediction method or motion information based on inter-frame prediction is outputted as side information to the entropy encoder 115 and the in-loop filter 109 through a line L112.

The subtracter 103 subtracts the prediction signal inputted through the line L111 from the signal of the target block which is inputted through the line L102 in order to generate a residual signal. The generated residual signal is outputted to the transformer 104 through a line L103.

The transformer 104 transforms the difference signal into transform coefficients in the frequency domain for each of difference signal blocks (in this case, a block of 4×4 pixels) obtained by further dividing the target block. The transform coefficients obtained through transform are outputted to the quantizer 105 through a line L104 and compressed to become quantized transform coefficients through a quantization process by the quantizer 105. In the moving picture encoding device 100, one of the transformer 104 and the quantizer 105 may be omitted.

The entropy encoder 112 transforms the quantized transform coefficients inputted through a line L105 into variable-length codes and outputs the variable-length codes from the output terminal 113 in the form of a bitstream. Instead of variable-length encoding, arithmetic encoding may be applied. Simultaneously, the entropy encoder 112 also entropy-encodes the side information inputted through the line L112 along with the quantized transform coefficients.

The de-quantizer 106 de-quantizes the quantized transform coefficients inputted through the line L105 with a quantization scale equal to the one used in the quantizer 105 to restore transform coefficients, and outputs the transform coefficients to the inverse transformer 107 through a line L106. The inverse transformer 107 inverse-transforms the transform coefficients to reproduce a residual signal. A quantization parameter representing the quantization scale is sent from the quantizer 105 to the entropy encoder 112, entropy-encoded by the entropy encoder 112 for each frame or block, and outputted from the output terminal 113 as a part of the bitstream (that is, notified to the moving picture decoding device which decodes the bitstream). The de-quantizer 106 outputs information of the quantized transform coefficients regarding each 4×4 block to the in-loop filter 109 through a line L113.

The adder 108 adds the prediction signal inputted through the line L111 to the reproduced residual signal inputted through a line L107 to restore a reproduced picture, and outputs the reproduced picture to the in-loop filter 109 through a line L108.

The in-loop filter 109 removes unnecessary distortions from the reproduced picture, using the side information inputted through the line L112 and the information of the quantized transform coefficients for each 4×4 block inputted through the line L113. This is called "filtering process", and the details thereof will be described below. The reproduced picture subjected to the filtering process is used as a reference picture in encoding of a next picture. The reproduced picture is outputted from the in-loop filter 109 to the frame memory 110 through a line L109 and stored in the frame memory 110.

(In-Loop Filter 109)

Next, the in-loop filter 109 will be described in detail with reference to FIGS. 2 to 6. In this embodiment, two types of filters having different functions are used. That is, the in-loop filter 109 includes a first filter (the filter described in Patent Literature 1) which removes distortions near edges to make a picture clear while preserving the edges, and a second filter which applies a blurring effect and removes block-like distortions which are not removed by the first filter.

Figure 2:
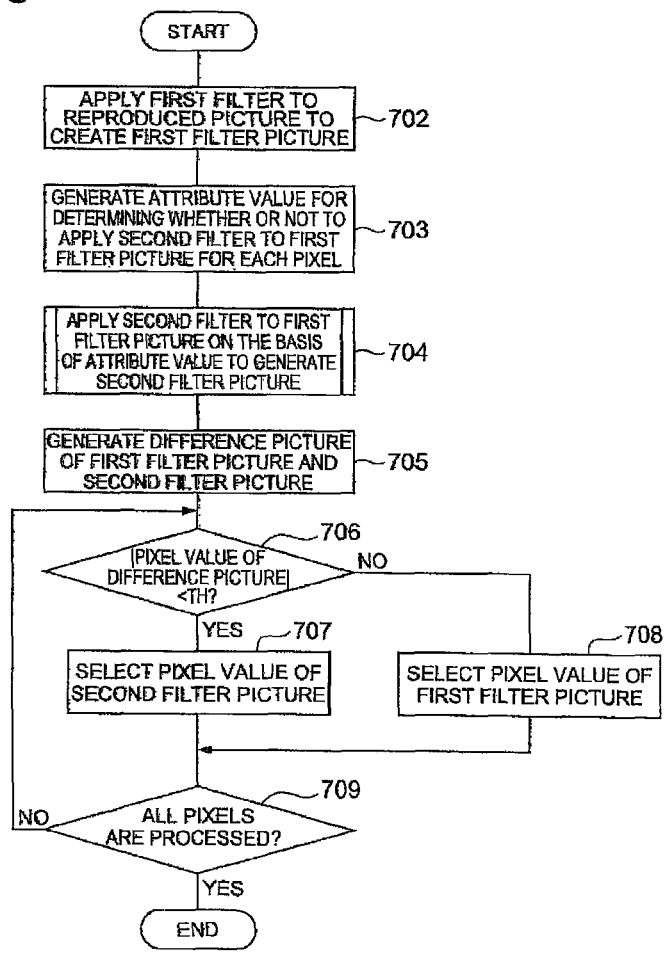
FIG. 2 is a flowchart illustrating processing of an in-loop filter.

Hereinafter, the operation of the in-loop filter 109 will be described. FIG. 2 shows a process flow performed by the in-loop filter 109. The in-loop filter 109 first applies the first filter to a reproduced picture inputted through the line L108 to generate a first filter picture (Step 702).

Next, the in-loop filter 109 generates an attribute value for determining whether or not to apply the second filter to each pixel of the first filter picture (Step 703). Subsequently, the attribute value of each pixel is used to select a pixel whose signal value is not changed even when the first filter is applied.

The in-loop filter 109 applies the second filter to the first filter picture on the basis of the generated attribute value to generate a second filter picture (Step 704). That is, the in-loop filter 109 determines whether or not to apply the second filter to each pixel in accordance with the attribute value of each pixel of the first filter picture, applies the second filter to a pixel which is determined necessary to apply the second filter, and does not apply the second filter to a pixel which is determined not necessary to apply the second filter, thereby generating the second filter picture. As described above, the attribute value of each pixel of the first filter picture is used, such that the second filter can be selectively applied to a region where a distortion remains even when the first filter is applied. Thus, it is possible to generate a second filter picture in which only a residual distorted signal in the first filter picture is suppressed without blurring edges.

Thereafter, the in-loop filter 109 generates a difference picture between the first filter picture and the second filter picture (Step 705). Next, the in-loop filter 109 compares the value of a pixel in the difference picture (hereinafter, referred to as "difference value") with a predefined threshold value TH (Step 706). When the difference value is smaller than the threshold value TH, the pixel value of the second filter picture is selected as a pixel value of a final filter picture (Step 707). When the difference value is equal to or greater than the threshold value TH, the pixel value of the first filter picture is selected as a pixel value of a final filter picture (Step 708). Thus, through the comparison process with the first filter picture, the pixels in the second filter picture after the filter processing is applied include pixels of the fist filter picture when a change in the signal value is great and from pixels of the second filter picture when a change in the signal value is small. Therefore, edges are not distorted, and only excess residual distortions can be removed.

Subsequently, Steps 706 to 708 are repeated for all the pixels of the difference picture (Step 709).

The threshold value TH may be defined in accordance with a quantization parameter which determines the quantization scale, for example, in the quantizer or the de-quantizer. If the threshold value TH is defined in this manner, it is possible to cope with the situation in which a coarser quantization scale leads to a greater level of residual distortion.

It is not necessary to generate the difference picture of Step 705. For example, a method may dispense with generating the difference picture in which a difference value is calculated for each pixel while acquiring a pixel from the first filter picture and the second filter picture to perform the processes of Steps 706 to 708.

The process for selecting a filter picture in Steps 705 to 708 may be omitted. A minimum square error filter (Wiener Filter) in which an error between the second filter picture and the inputted picture is minimized may be calculated, and instead of performing the process of Steps 705 to 708, the minimum square error filter may be applied to the second filter picture. Similarly to the above-described quantization parameter, the calculated minimum square error filter may be encoded and transmitted to the outside.

Next, the second filter picture generation process in Step 704 in FIG. 2 will be described in detail with reference to FIG. 3.

Figure 3:
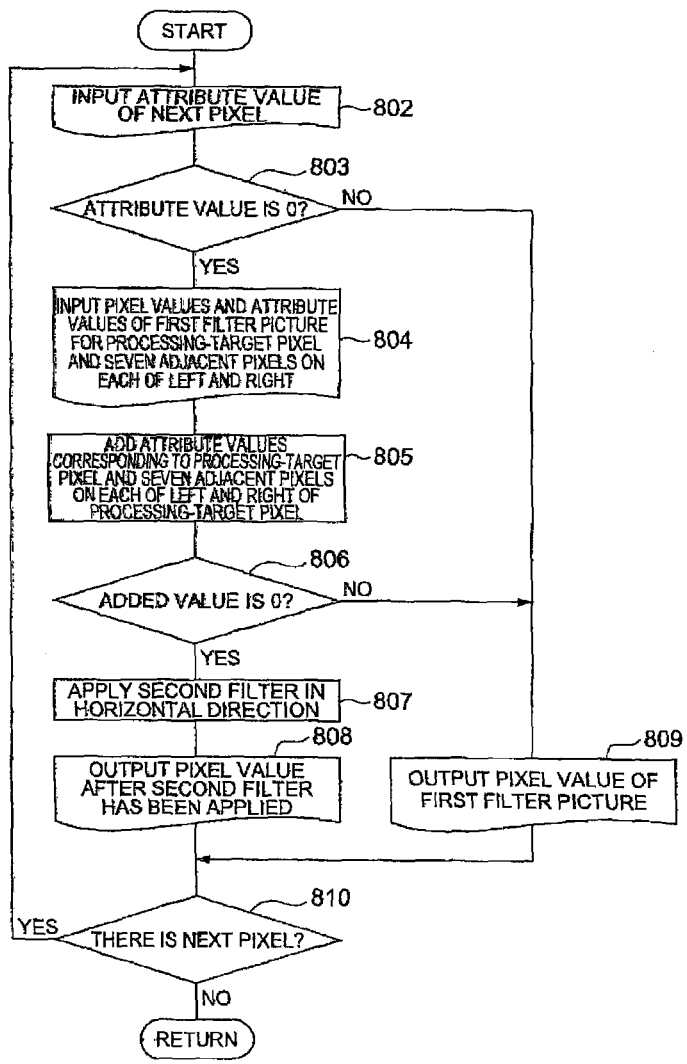
FIG. 3 is a flowchart illustrating a second filter picture generation process.

In Step 802 of FIG. 3, the attribute value of each pixel of the first filter picture is sequentially inputted to the in-loop filter 109, and the in-loop filter 109 determines whether or not the input attribute value is 0 (Step 803). When the attribute value is not 0 (is 1), the process proceeds to Step 809. When the attribute value is 0, the process proceeds to Step 804.

In Step 804, the in-loop filter 109 acquires pixel values and attribute values for 15 pixels which include a target pixel to be processed in the first filter picture and seven pixels located immediately on each of the left and right sides of the target pixel. Subsequently, the acquired attribute values of the 15 pixels are added (Step 805), and it is determined whether or not the added value is 0 (Step 806). When the added value is not 0, the process proceeds to Step 809. When the added value is 0, the process proceeds to Step 807.

In Step 807, the in-loop filter 109 applies the second filter to the target pixel with reference to the 14 pixels from the seven pixels located immediately on each of the left and right sides of the target pixel. Although in this case, the 14 pixels to be referenced are pixels within the first filter picture, pixels after the second filter has been applied may be referenced according to a predetermined method. The number of filter taps is as described below, and the filter type is a low-pass filter. That is, the value of an output pixel of the second filter is calculated by multiplying the value of a target pixel in the first filter picture by 2, adding the values of seven adjacent pixels from each of the adjacent left and right of the target pixel to the multiplied value, and dividing the added value by 16. Filter tap={1,1,1,1,1,1,1,2,1,1,1,1,1,1,1}/16

In Step 808, the in-loop filter 109 outputs the value of the output pixel of the second filter as a pixel value of the second filter picture. Meanwhile, in Step 809, the in-loop filter 109 outputs the value of the corresponding pixel in the first filter picture as a pixel value of the second filter picture.

Next, in Step 810, it is confirmed whether or not a next target pixel exists. When a next target pixel exists, the process returns to Step 802, the processes of Steps 802 to 810 are again performed for the remaining target pixels. When the processes of Steps 802 to 810 have been performed for all the target pixels, the process flow of FIG. 3 ends.

In addition to the above-described process, in Steps 802 to 810, the filtering process may be performed in the "vertical direction" (that is, seven pixels from each of the adjacent top and bottom of the target pixel are referenced, and the picture is scanned in the vertical direction from the lower left to the lower right (from above to below and from left to right). In other words, the second filter may function to apply a one-dimensional filter in the "vertical direction" to a picture to which a one-dimensional filter in the "horizontal direction" has been applied. In addition, the filter picture selection processes of Steps 705 to 708 may be performed on a picture to which a one-dimensional filter in the "horizontal direction" has been applied, and a one-dimensional filter in the "vertical direction" may be applied to the generated intermediate output picture. Thereafter, when the filter picture selection processes of Steps 705 to 708 are performed on a picture to which a one-dimensional filter in the "vertical direction" has been applied, instead of the difference value, as shown in Step 705, between the first filter picture and the second filter picture, the processes of Steps 706 to 708 may be performed on the difference value between the intermediate output picture and a picture (corresponding to the second filter picture) to which a one-dimensional filter in the "vertical direction" has been applied. This process can be achieved by performing the processes of Steps 706 to 708 of FIG. 2 between Steps 807 and 808 of FIG. 3. That is, the threshold value processing (Step 706) may be performed on the difference between the pixel values before and after the filter is applied in the process of Step 807, and either the pixel value (Step 707) after the filter has been applied or the pixel value (Step 708) before the filter is applied is outputted in Step 808. The processes of Steps 802 to 810 (including Steps 706 to 708) may be changed such that the processes are performed first in the horizontal direction and then in the vertical direction. The one-dimensional filters in the "horizontal direction" and the "vertical direction" may be different filters. A different threshold value TH may be used in the filter picture selection process after the one-dimensional filters in the "horizontal direction" and "vertical direction" are applied. The one-dimensional filters and the threshold values may be encoded. Two sets of the one-dimensional filter and the threshold value will be encoded which come from each of the horizontal direction and the vertical direction. In the one-dimensional filter in the "horizontal direction" and the one-dimensional filter in the "vertical direction", the sequence in which the filters are applied may be set such that the one-dimensional filter in the "vertical direction" is first executed. Only the one-dimensional filter in the "vertical direction" may be executed.

The filter shape of the second filter is not limited to the above-described 15-tap filter. Instead of a one-dimensional filter, a two-dimensional filter may be applied, or another fixed filter may be applied. The number of taps and the filter coefficients are not limited, and the shape information of the second filter and the number-of-taps information may be encoded, and the encoded data may be included in a bitstream and transmitted to the outside. Specifically, a configuration may be adopted in which all the attribute values are set to "0", the minimum square error filter (Wiener Filter) to minimize an error between the first filter picture and the input picture is calculated, and the minimum square error filter is set as the second filter. In this configuration, the minimum square error filter may be encoded, and the encoded data may be included in a bitstream and transmitted to the outside. A method may also be adopted in which the attribute value is inputted outside the in-loop filter 109 (for example, a method may be used in which a target pixel to which a filter has to be applied is determined by the encoding device and the decoding device). In the method, the attribute value may be subjected to compression encoding.

Although in the above description, the first filtering process and the second filtering process are performed on pixels, the filtering process may be performed on blocks (for example, target blocks to be encoded). However, since reproduced signals of future blocks are used in the order they are reproduced, when the filtering process is performed on blocks, it is necessary that the filtering process in the encoding and decoding processes is delayed by blocks in accordance with the number of taps of the filter. For example, as described above, when the block size is 8×8, and the number of filter taps is 7, the filtering process in the encoding and decoding processes is delayed by (1 block column+1 block) such that pixels to be referenced by the second filter are already reproduced.

Although in above description, all the pixels within an encoding frame will be subjected to the second filtering process, the second filtering process may be applied only to prediction blocks (intra-blocks) in a picture in which a residual distorted signal is likely to occur. The second filtering process may be applied only to an encoding frame (intra-frame) in a picture, or the second filtering processing may be applied only to a frame in which the frequency of an intra-block appearance in a frame is greater than a predetermined value. In this way, it is possible to limit blocks to which the second filtering process is applied, thereby reducing the computation load.

Figure 4:
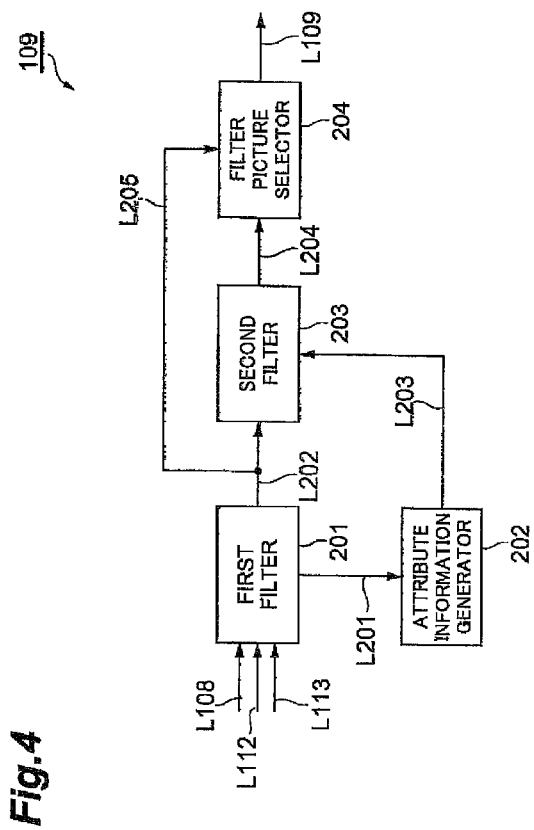
FIG. 4 is a block diagram of an in-loop filter.

FIG. 4 is a block diagram of the in-loop filter 109, which performs the in-loop filter process described in FIGS. 2 and 3.

The in-loop filter 109 includes a first filter 201, an attribute information generator 202, a second filter 203, and a filter picture selector 204.

The first filter 201 applies the first filter to a reproduced picture inputted through the line L108 on the basis of the side information inputted through the line L112 and the information on the quantized transform coefficients of each 4×4 block inputted through the line L113 by the method described in Patent Literature 1 to generate the first filter picture. The generated first filter picture is outputted to the second filter 203 through a line L202 and also outputted to the filter picture selector 204 through a line L205. Information representing the application of the first filter 201 is outputted to the attribute information generator 202 through a line L201.

The attribute information generator 202 uses inputted information regarding the application of the first filter 201 and generates an attribute value indicating whether or not to apply the second filter 203 to each pixel of the first filter picture. The generated attribute value is outputted to the second filter 203 through a line L203. The attribute information generator 202 is processed on the basis of data obtained from the first filter 201. Thus, the function of the attribute information generator 202 can be included in the first filter 201.

The second filter 203 applies the second filter to the first filter picture inputted through the line L202 on the basis of the attribute value inputted through the line L203 to generate the second filter picture. The generated second filter picture is outputted to the filter picture selector 204 through a line L204.

As shown in Steps 706 to 708 of FIG. 2, the filter picture selector 204 generates a difference picture between the first filter picture inputted through the line L205 and the second filter picture inputted through the line L204, and compares a value (a difference value) of each pixel of the difference picture with the predetermined threshold value TH. Here, when the difference value is smaller than the threshold value TH, the pixel value of the second filter picture is selected. Whereas, when the difference value is equal to or greater than the threshold value TH, the pixel value of the first filter picture is selected. A filter picture finally generated is outputted to the frame memory 110 through the line L109.

The difference value may be calculated each time acquiring a pixel from each of the first filter picture and the second filter picture, without creating the difference picture, and the filter picture selection process may be performed on respective pixels.

In the in-loop filter 109, the filter picture selector 204 may be omitted. When the second filter is formed of one-dimensional filters for the "horizontal direction" and the "vertical direction", the filter picture selector 204 is included in the second filter 203, such that a method can be realized in which the filter picture selection process of Steps 706 to 708 is performed after the one-dimensional filter in the "horizontal direction" is applied and after the one-dimensional filter in the "vertical direction" is applied. The process of the filter picture selector 204 may be changed such that the minimum square error filter (Wiener Filter) to minimize an error between the second filter picture and the input picture is calculated, and the minimum square error filter is applied to the second filter picture. Similarly to the above-described quantization parameter, the calculated minimum square error filter may be encoded and transmitted to the outside.

Figure 5:
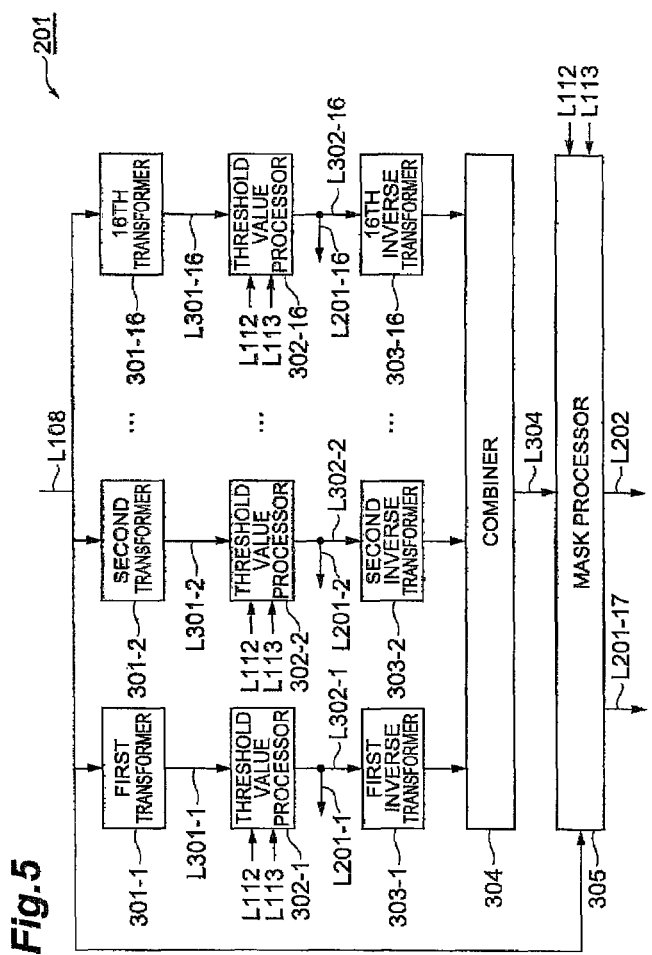
FIG. 5 is a block diagram showing an example of a first filter.

FIG. 5 is a block diagram showing an example of the first filter 201 described in Patent Literature 1. The first filter 201 includes 16 transformers (referred to as first to 16-th transformers) 301-1 to 301-16, 16 threshold value processors 302-1 to 302-16, 16 inverse transformers (referred to as first to 16-th inverse transformers) 303-1 to 303-16, a combiner 304, and a mask processor 305.

A reproduced picture inputted to the first filter 201 through the line L108 is divided into, for example and not limited to, blocks of 4×4 pixels and frequency-transformed. At this time, the transformers (first transformer 301-1 to 16-th transformer 301-16) carry out frequency transform at 16 times on a reproduced picture while shifting the block boundary by one pixel within a range of four pixels horizontally and four pixels vertically, generating 16 sets of transformed pictures. In this embodiment, for the sake of distinction, a 4×4 block in the transformer 104 and the inverse transformer 107 of FIG. 1 is called "C-block", and a 4×4 block in the first filter 201 of FIG. 5 is called "D-block".

The 16 transformed pictures are respectively inputted to the threshold value processors 302-1 to 302-16. Each of the threshold value processors performs a threshold value process on the transform coefficients of all the D-blocks on the basis of the side information inputted through the line L112 and the information of the quantized transform coefficients regarding each C-block inputted through the line L113, and changes a transform coefficient smaller than the threshold value to 0. That is, a transform coefficient which may cause distortion is set to 0 to remove the distortion within a picture.

The threshold value differs for respective D-blocks and is determined on the basis of a filter mode relating to the C-block. Specifically, first, a filter mode is set at the boundary of two C-blocks using the prediction method of each target block and the information of the quantized transform coefficients relating to each C-block. A filter mode of the D-block is determined on the basis of the filter mode of the C-block boundary passed over by the D-block. For example, the filter modes are given priority in advance, and when the D-block passes over a plurality of C-block boundaries, a filter mode having the highest priority is selected from among the filter modes.

The D-block which is subjected to the threshold value process is outputted to the inverse transformers 303-1 to 303-16. Simultaneously, the number of zero coefficients belonging to each D-block is outputted to the attribute information generator 202 through the line L201.

The inverse transformers (inverse transformers 303-1 to 303-16) carry out inverse transform on the 16 transformed pictures, which have been subjected to the threshold value process, to generate 16 sets of estimated pictures. The generated 16 sets of estimated pictures are outputted to the combiner 304 through a line L303.

The combiner 304 combines the 16 sets of estimated pictures through a linear weighting process to generate the first filter picture. The generated first filter picture is outputted to the mask processor 305 through a line L304. In the linear weighting process, weight coefficients are determined on the basis of the number of zero coefficients within each D-block or the like. Specifically, since a D-block having a large number of zero coefficients is presumed to belong to a flat area, a D-block having a large number of zero coefficients is given a great weight. On the other hand, since a D-block having a small number of zero coefficients is presumed to include an edge, a D-block having a small number of zero coefficients is given a small weight. In the first filter process, an edge is extracted by taking advantage of the fact that, the transform efficiency of block transform is higher in a flatter area, and noise in the flat area is suppressed, while preserving an edge.

In order to avoid an excessive filtering process, the mask processor 305 performs a masking process at C-block boundaries of the first filter picture with a reproduced picture inputted through the line L108. Specifically, the mask processor 305 determines a range of pixels to be masked at each C-block boundary, and substitutes pixels of the first filter picture with pixels of the reproduced picture inputted through the line L108 on the basis of the determined range of pixels to be masked. In other words, with regard to pixels at pixel positions which are not masked through the masking process, the pixels of the first filter picture are substituted with the pixels of the reproduced picture input through the line L108. That is, the reproduced pixels at these pixel positions pass unchanged through the first filter. Information on the masked pixels is outputted to the attribute information generator 202 through lines L201-17. The first filter picture subjected to the masking process is outputted to the second filter 203 through the line L202.

Though not shown, the above-described process by the transformers 301-1 to 301-16, the threshold value processors 302-1 to 302-16, the inverse transformers 303-1 to 303-16, the combiner 304, and the mask processor 305 may be repeatedly performed, using different threshold values.

Since the second filter processes a pixel which is saturated and cannot be processed in the first filter, the support range of the filter is more extensive than that of the first filter. For example, it is assumed that, when the first filter is a filter which references pixels within a range surrounded by three adjacent pixels while the filter is applied to a pixel, the second filter is a filter which references pixels within a range surrounded by seven adjacent pixels (that is, the number of pixels greater than the three pixels in the first filter) while the filter is applied to a pixel.

Figure 6:
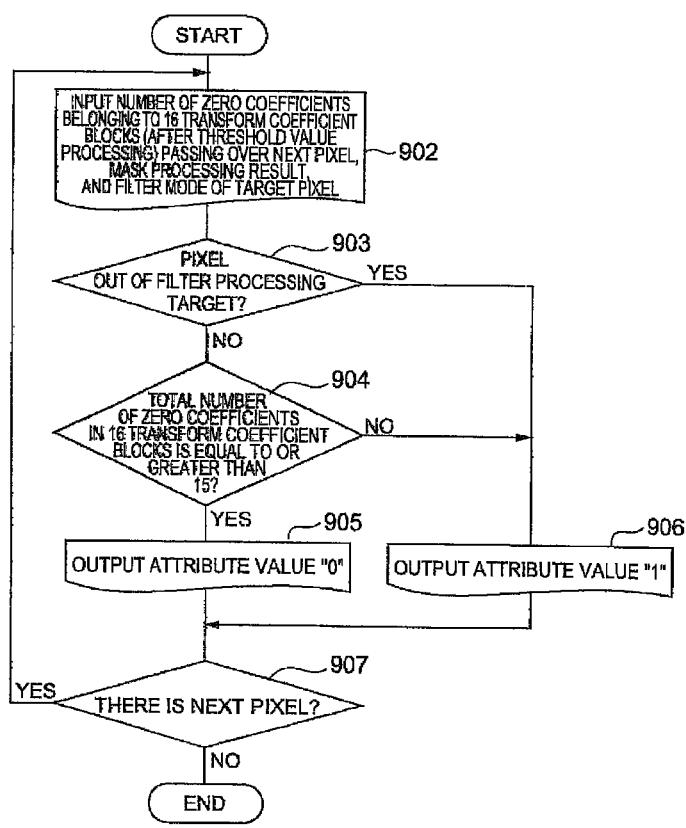
FIG. 6 is a flowchart illustrating processing in an attribute information generator 202.

FIG. 6 shows a process flow in the attribute information generator 202 of FIG. 4. The number of zero coefficients which belong to 16 D-blocks passing over the target pixel for determining the attribute value and the masking process result in the first filter 201 of the target pixel for determining the attribute value are inputted to the attribute information generator 202 through the line L201 (Step 902).

Next, the attribute information generator 202 determines, from the mask processing result in the first filter 201, whether or not the target pixel is a pixel not be filtered (that is, a pixel to which the first filter is not applied and which is not masked through the mask process) (Step 903). When the target pixel is a pixel not to be filtered, the process proceeds to Step 906. When the target pixel is not a pixel not to be filtered (a pixel to be filtered), the process proceeds to Step 904.

In Step 904, the attribute information generator 202 determines whether or not the number of zero coefficients within each block of the 16 D-blocks is equal to or greater than 15. When the number of zero coefficients within the block is equal to or greater than 15 in all the D-blocks, the process proceeds to Step 905. When the number of zero coefficients within the block is smaller than 15 in one or more D-blocks, the process proceeds to Step 906.

In Step 905, the attribute value of the target pixel is outputted to be "0". On the other hand, in Step 906, the attribute value of the target pixel is outputted to be "1".

The processing of Steps 902 to 906 is repeated until the attribute values of all the pixels are determined (Step 907).

The method of determining the attribute value is not limited to the above. For example, with regard to the number of zero coefficients within the D-block, another reference value may be used, not equal to or greater than "15". Although in the above description, the number of zero coefficients within the D-block is used as a measure for evaluation, the number of zero coefficients other than the DC coefficients (direct-current components) may be used as a measure for evaluation.

A pixel which is not masked through the masking process of the first filter passes unchanged through the first filter and may thus be subjected to the filtering process of the second filter.

Another example may be that an area is extracted which is formed of pixels having signal values unchanged even when the first filter is applied, and the attribute value is determined. Specifically, a difference between an input picture to the first filter and an output picture from the first filter is obtained for each pixel, the attribute value is set to "0" for pixels in which the absolute value of the difference is smaller than a defined value (or pixels with the differences being 0), and the attribute value is set to "1" for other pixels.

As described above, in the in-loop filter of this embodiment, distortions near edges are suppressed by the first filter while the edges themselves of a picture are preserved. On the basis of information indicative of an area where there is a small change in the first filter (an area where distortions which cannot be removed in the first filter are likely to be included), the second filter is selectively applied to the area. Thus, it is possible to generate a filter picture with clear edges and with a small amount of residual distorted components.

Here, although the method described in Patent Literature 1 has been described as an example for the first filtering process, the invention is not limited to the method described in Patent Literature 1. For example, even when the details of the first filtering process are unclear, the process by the second filter of this embodiment to remove the residual distorted signal can be applied.

As an example, as described above, an area may be extracted which is formed of pixels having signal values unchanged even when the first filter is applied, and the attribute value may be determined. As another example, the first filter process is performed twice while varying the intensity of the filter, and a difference is obtained to determine the attribute value. For example, the first filter 201 performs the first filtering process on a reproduced picture, taking into consideration the quantization parameter QP used in the quantizer 105 or the de-quantizer 107. The attribute information generator 202 performs the first filtering process on the reproduced picture with two parameters (corresponding, for example, to "QP+α" and "QP−α") while varying the intensity of the filter. The attribute information generator 202 calculates the difference value of two filter pictures obtained through the first filtering process which is performed twice, and the obtained difference value is set as an attribute value for the second filter picture indicative of the application of the first filter. With this process, it is possible to extract an area which is formed of pixels having the result of the filter process unchanged even when the intensity of the filter is varied. In this area, the first filtering process is saturated with a quantization level represented by QP, and the pixels of the reproduced picture pass unchanged through the first filter. That is, even when a distortion occurs in the reproduced picture, the distortion cannot be removed through the first filtering process. It is possible to extract an area having distortion unable to be removed through the first filter process.

(Picture Processing Device)

The above-described process of the in-loop filter 109 is not limited to distortion removable from pictures reproduced in encoding but can be applied to general distortion removal. Except the side information inputted through the line L112 and the information of the quantized transform coefficients regarding each 4×4 block inputted through the line L113, the processes shown in FIGS. 2 to 6, such as the first/second filtering process, the attribute information generation process, and the filter picture selection process, can also be applied to distortion removal from general pictures. In the distortion removal from general pictures, the side information and the information of the quantized transform coefficients regarding each 4×4 block may be replaced with information obtained from an input signal.

(Moving Picture Decoding Device)

Figure 7:
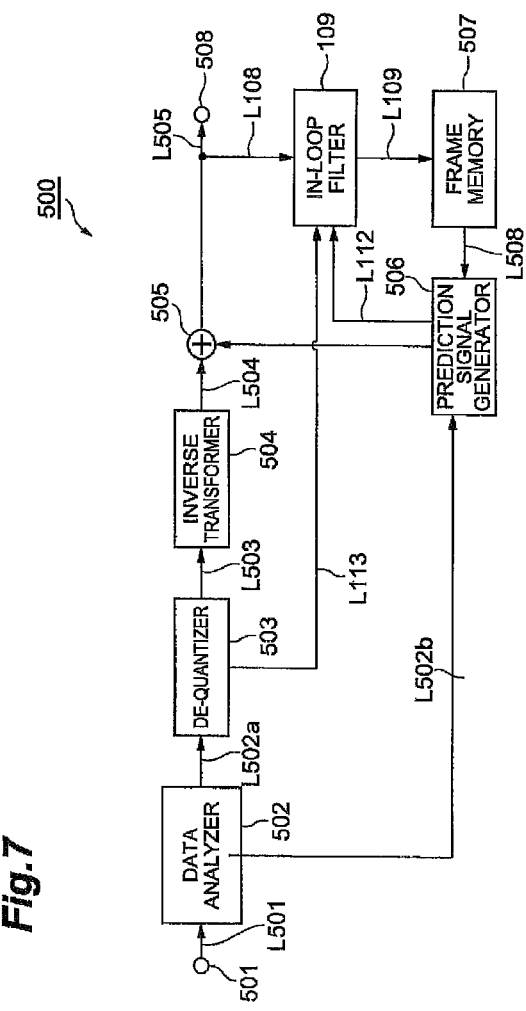
FIG. 7 is a block diagram of a moving picture decoding device according to an embodiment of the present invention.

FIG. 7 is a block diagram of a moving picture decoding device 500 which has a residual distorted signal removing function according to the present invention. The moving picture decoding device 500 includes an input terminal 501, a data analyzer 502, a de-quantizer 503, an inverse transformer 504, an adder 505, a prediction signal generator 506, an in-loop filter 109, a frame memory 507, and a picture output terminal 508. The in-loop filter 109 functions in the same manner as the in-loop filter 109 of FIG. 1.

The operation of each constituent part of the moving picture decoding device 500 will be described. A bitstream including the side information necessary to generate a prediction signal of each target block and encoded data of a residual signal of the target block are inputted to the input terminal 501. In this embodiment, a bitstream obtained through the encoding process by the moving picture encoding device 100 of FIG. 1 is inputted to the moving picture decoding device 500.

The data analyzer 502 analyzes the input data (inputted bitstream) and decodes the encoded data (quantized transform coefficients) of the residual signal and the side information. When a quantization parameter for determining a quantization scale or the filter coefficients and the number of taps of the second filter used in the in-loop filter are included in the input data, the data analyzer 502 decodes these kinds of information. As a decoding method, variable-length decoding, arithmetic decoding, or the like is used.

Decoded data (quantized transform coefficients) of the residual signal is inputted to the de-quantizer 503 through a line L502a. The de-quantizer 503 de-quantizes the quantized transform coefficients on the basis of the quantization parameter, restores the transform coefficients, and outputs the transform coefficients to the inverse transformer 504 through a line L503. The inverse transformer 504 inverse-transforms the inputted transform coefficients to restore the residual signal and outputs the residual signal to the adder 505 through a line L504. In the moving picture decoding device 500, one of the inverse transformer 504 and the dequantizer 503 may be omitted.

Meanwhile, the side information decoded by the data analyzer 502 is outputted to the prediction signal generator 506 through a line L502b. The prediction signal generator 506 generates a prediction signal on the basis of the inputted side information, outputs the prediction signal to the adder 505 through a line L506, and outputs the side information to the in-loop filter 109 through the line L112. The adder 505 adds the prediction signal and the restored residual signal to generate a reproduced picture, outputs the reproduced picture to the in-loop filter 109 through the line L108, and outputs the reproduced picture from the picture output terminal 508 through a line L505.

The in-loop filter 109 removes unnecessary distortions from the reproduced picture (that is, performs a filter process), using the side information inputted through the line L112 and the information of the quantize transform coefficients regarding each 4×4 block inputted through the line L113. The reproduced picture subjected to the filter process is used as a reference picture to encode a next picture, and is thus outputted to the frame memory 507 through the line L109 and stored in the frame memory 507.

The above-described process is repeated until all pieces of data of the bitstream are processed. In this way, moving picture data is restored. Since the processes performed in the in-loop filter 109 have been described with reference to FIGS. 2 to 6, description thereof will be omitted.

(Moving Picture Encoding Method)

Figure 8:
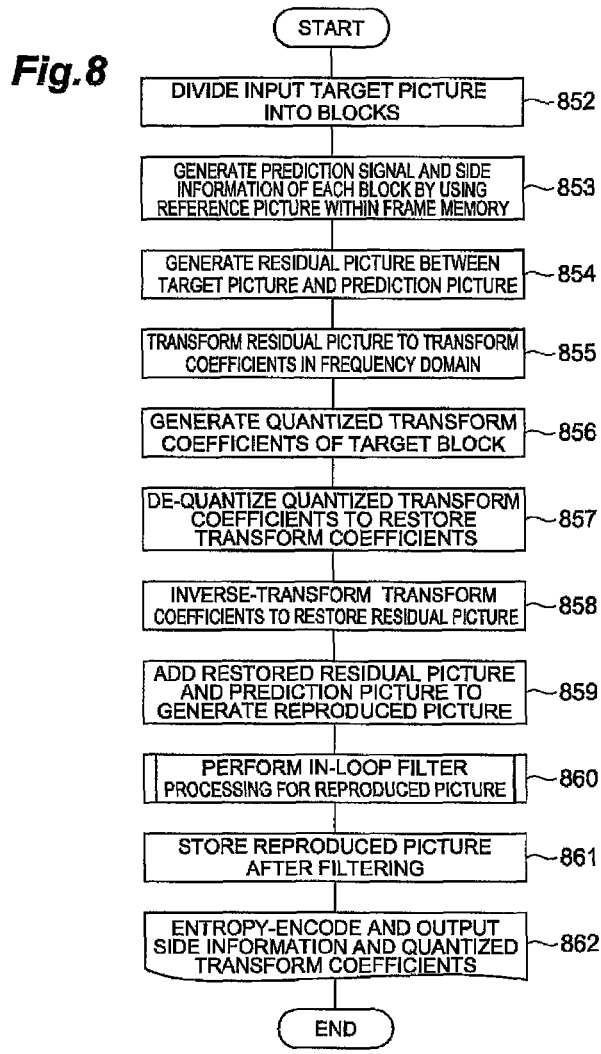
FIG. 8 is a flowchart showing a moving picture encoding method according to the embodiment.

FIG. 8 is a flowchart of moving picture encoding process, including the residual distorted signal removing function, which is performed by the moving picture encoding device 100. First, a target picture to be encoded (target picture) is inputted to the moving picture encoding device 100. The block divider 102 divides the inputted target picture into a plurality of small blocks (Step 852).

Next, the prediction signal generator 111 determines for each target block one prediction method from among a plurality of prediction methods, using a reference picture stored in the frame memory 110, to generate a prediction signal. Simultaneously, the prediction signal generator 111 generates side information necessary to generate the prediction signal (Step 853). Since the prediction signal is obtained for each target block, a prediction picture for the target picture is obtained.

The subtracter 103 generates a residual picture of the target picture and the prediction picture (Step 854), and the transformer 104 transforms each block of the residual picture into the transform coefficients in the frequency domain (Step 855). The quantizer 105 quantizes the transform coefficients on the basis of a quantization parameter for determining the quantization scale to generate quantized transform coefficients (Step 856).

Next, the de-quantizer 106 de-quantizes the quantized transform coefficients on the basis of the quantization parameter to decode transform coefficients (Step 857). The inverse transformer 107 inverse-transforms the transform coefficients to restore (reproduce) a residual picture (Step 858). The adder 108 adds the restored residual picture and the prediction picture to generate a reproduced picture (Step 859).

Next, the in-loop filter 109 performs an in-loop filtering process to remove unnecessary distortions from the reproduced picture, using the side information and the information of the quantized transform coefficients (Step 860). The reproduced picture subjected to the in-loop filtering process is used as a reference picture for encoding of a next picture and is thus outputted to and stored in the frame memory 110 (Step 861).

The entropy encoder 112 entropy-encodes the side information and the quantized transform coefficients and outputs the side information and the quantized transform coefficients in the form of bitstream (Step 862).

Since the in-loop filter processing in Step 860 has been described with reference to FIGS. 2, 3, and 6, description thereof will be omitted.

(Picture Processing Method)

The above-described process of the in-loop filter 109 is not limited to distortion removal from reproduced pictures generated in encoding and may also be applied to general noise removal. Except the side information and the information of the quantized transform coefficients regarding each 4×4 block, the processes shown in FIGS. 2, 3, and 6, such as the first/second filtering process including the residual distorted signal removing function, the attribute information generation process, and the filter picture selection process, may also be applied to a general picture processing method which removes distortion. The side information and the quantized transform coefficients regarding each 4×4 block may be replaced with information obtained from an input signal.

(Moving Picture Decoding Method)

Figure 9:
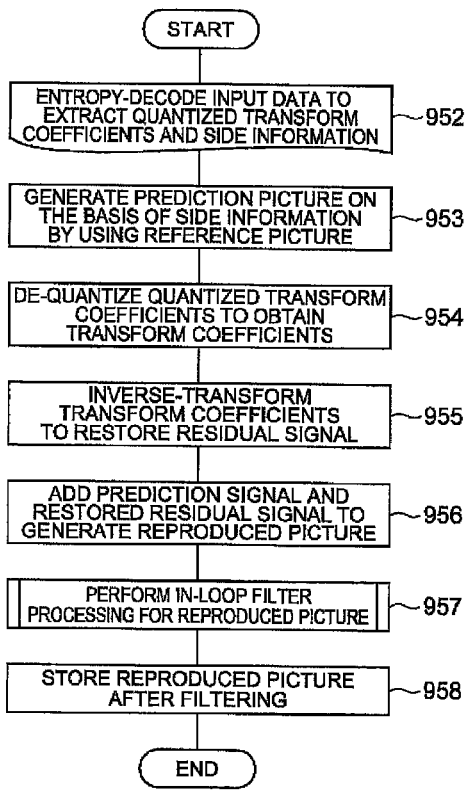
FIG. 9 is a flowchart showing a moving picture decoding method according to the embodiment.

FIG. 9 is a flowchart of a moving picture decoding process, including the residual distorted signal removing function, which is performed by the moving picture decoding device 500. In Step 952 of FIG. 9, compression-encoded data is inputted to the moving picture decoding device 500, and the data analyzer 902 entropy-decodes the input data and extracts the quantized transform coefficients and the side information. When the input data includes a quantization parameter and information of the filter coefficients or the number of filter taps used in the in-loop filter, the quantization parameter and the information of the filter coefficients or the number of filter taps are also decoded.

Next, the prediction signal generator 506 generates a prediction picture on the basis of the side information, using a reference picture stored in the frame memory 507 (Step 953).

The de-quantizer 503 de-quantizes the extracted quantized transform coefficients on the basis of the quantization parameter to obtain transform coefficients (Step 954). The inverse transformer 504 inverse-transforms the transform coefficients to restore a residual picture (Step 955).

The adder 505 adds the prediction picture and the restored residual picture to generate a reproduced picture (Step 956).

Next, the in-loop filter 109 performs an in-loop filtering process to remove unnecessary distortions from the reproduced picture, using the side information and the information of the quantized transform coefficients (Step 957). The reproduced picture subjected to the in-loop filtering process is used as a reference picture for encoding of a next picture and thus is outputted to and stored in the frame memory 110 (Step 958).

Since the in-loop filter processing in Step 957 has been described with reference to FIGS. 2, 3, and 6, description thereof will be omitted.

(Moving Picture Encoding Program, Moving Picture Decoding Program, and Picture Processing Program)

The invention regarding a moving picture encoding device can be embodied as an invention directed to a moving picture encoding program which causes a computer to function as the moving picture encoding device. Alternatively, the moving picture encoding method according to this embodiment may be stored in a recording medium as a program and provided. The invention regarding a moving picture decoding device can be embodied as an invention directed to a moving picture decoding program which causes a computer to function as the moving picture decoding device. Alternatively, the moving picture decoding method according to this embodiment may be stored in a recording medium as a program and provided. The invention regarding a picture processing device can be embodied as an invention directed to a picture processing program which causes a computer to function as the picture processing device. Alternatively, the picture processing method according to this embodiment can be stored in a recording medium as a program and provided in such a form.

The moving picture encoding program, the picture processing program, and the moving picture decoding program may be stored, for example, in a recording medium and provided in such a form. As the recording medium, a recording medium, such as a flexible disk, a CD-ROM, or a DVD, a recording medium, such as a ROM, a semiconductor memory, or the like is exemplified.

Figure 10:
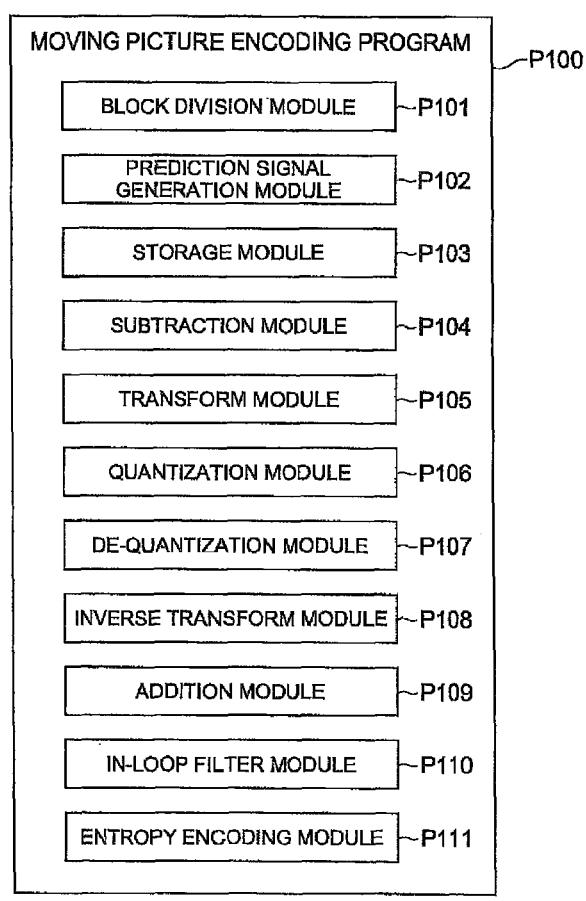
FIG. 10 is a block diagram showing the module of a moving picture encoding program according to the embodiment.

FIG. 10 shows the modules of a moving picture encoding program which can execute the moving picture encoding method. As shown in FIG. 10, a moving picture encoding program P100 includes a block division module P101, a prediction signal generation module P102, a storage module P103, a subtraction module P104, a transform module P105, a quantization module P106, a de-quantization module P107, an inverse transform module P108, an addition module P109, an in-loop filtering module P110, and an entropy encoding module P111.

The functions which are realized by executing the respective modules are the same as the above-described functions of the moving picture encoding device 100 of FIG. 1. That is, from the functional viewpoint, the block division module P101 corresponds to the block divider 102 of FIG. 1, the prediction signal generation module P102 corresponds to the prediction signal generator 111, the storage module P103 corresponds to the frame memory 110, the subtraction module P104 corresponds to the subtracter 103, the transform module P105 corresponds to the transformer 104, the quantization module P106 corresponds to the quantizer 105, the de-quantization module P107 corresponds to the de-quantizer 106, the inverse transform module P108 corresponds to the inverse transformer 107, the addition module P109 corresponds to the adder 108, the in-loop filter module P110 corresponds to the in-loop filter 109, and the entropy encoding module P111 corresponds to the entropy encoder 112.

Figure 11:
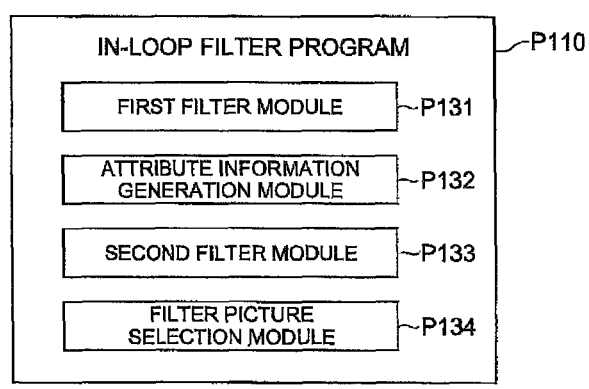
FIG. 11 is a block diagram showing the module of an in-loop filter program according to the embodiment.

The in-loop filter module P110 of FIG. 10 can be embodied as a single program and represented as an in-loop filter program P110 shown in FIG. 11. The in-loop filter program P110 includes a first filter module P131, an attribute information generation module P132, a second filter module P133, and a filter picture selection module P134.

The functions which are realized by executing the respective modules are the same as the above-described functions of the in-loop filter 109 of FIG. 4. That is, from the functional viewpoint, the first filter module P131 corresponds to the first filter 201 of FIG. 4, the attribute information generation module P132 corresponds to the attribute information generator 202, the second filter module P133 corresponds to the second filter 203, and the filter picture selection module P134 corresponds to the filter picture selector 204. The in-loop filter program P110 corresponds to the picture processing program of the invention.

Figure 12:
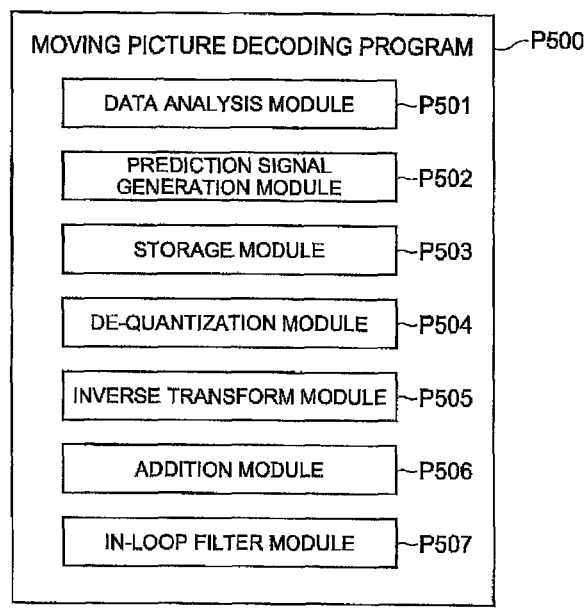
FIG. 12 is a block diagram showing the module of a moving picture decoding program according to the embodiment.

FIG. 12 shows the modules of a moving picture decoding program which can execute the moving picture decoding method. As shown in FIG. 12, a moving picture decoding program P500 includes a data analysis module P501, a prediction signal generation module P502, a storage module P503, a de-quantization module P504, an inverse transform module P505, an addition module P506, and an in-loop filter module P507.

The functions which are realized by executing the respective modules are the same as the above-described functions of the moving picture decoding device 500 of FIG. 7. That is, from the functional viewpoint, the data analysis module P501 corresponds to the data analyzer 502 of FIG. 7, the prediction signal generation module P502 corresponds to the prediction signal generator 506, the storage module P503 corresponds to the frame memory 507, the de-quantization module P504 corresponds to the de-quantizer 503, the inverse transform module P505 corresponds to the inverse transformer 504, the addition module P506 corresponds to the adder 505, and the in-loop filter module P507 corresponds to the in-loop filter 109.

The moving picture encoding program P100, the moving picture decoding program P500, and the in-loop filter program (picture processing program) P110 configured as above are stored in a recording medium 10 shown in FIG. 13 and executed by a computer 30 described below.

Figure 13:
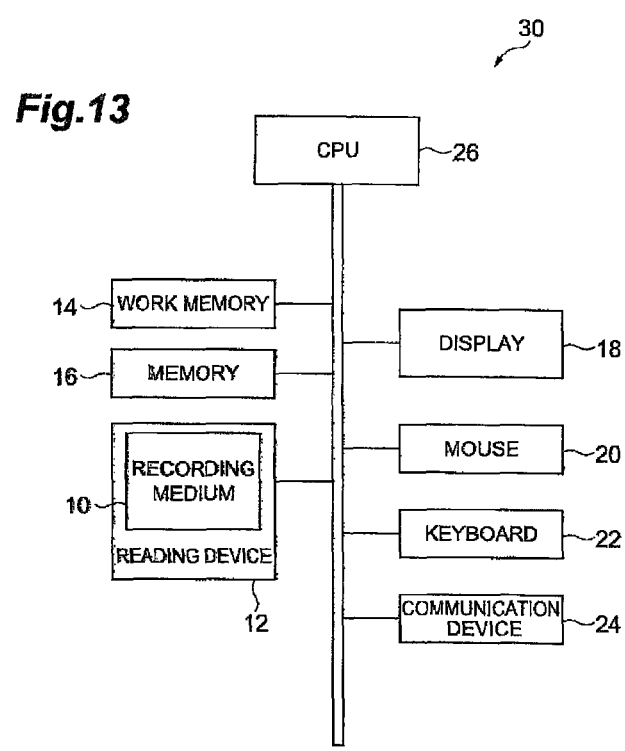
FIG. 13 is a hardware configuration diagram of a computer which executes a program recorded in a recording medium.
Figure 14:
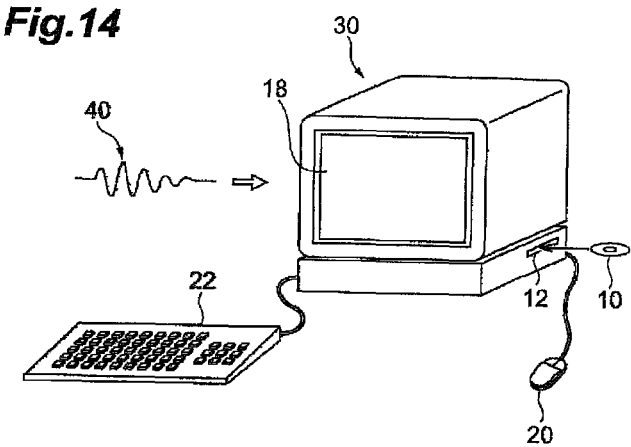
FIG. 14 is a perspective view of the computer of FIG. 13.

FIG. 13 shows a hardware configuration of the computer 30 which executes a program recorded in the recording medium 10. FIG. 14 is a perspective view of the computer 30.

Examples of the computer 30 include a DVD player, a set-top box, a mobile phone, and the like which have a CPU and perform processing or control by software.

As shown in FIG. 13, the computer 30 includes a reading device 12, such as a flexible disk drive device, a CD-ROM drive device, or a DVD drive device, a work memory (RAM) 14 in which an operating system resides, a nonvolatile memory 16 which stores a program stored in the recording medium 10, a display 18, a mouse 20 and a keyboard 22 serving as an input device, a communication device 24 which performs transmission/reception of data or the like, and a CPU 26 which controls the execution of the program. If the recording medium 10 is inserted into the reading device 12, the computer 30 can access the moving picture encoding program, the picture processing program, and the moving picture decoding program stored in the recording medium 10. The computer 30 can be operated as the moving picture encoding device according to the present invention by the moving picture encoding program, can be operated as the picture processing device according to the invention by the picture processing program, and can be operated as the moving picture decoding device according to the invention by the moving picture decoding program.

As shown in FIG. 14, the moving picture encoding program, the picture processing program, and the moving picture decoding program may be provided as computer data signals 40 superimposed on carrier waves through a wired network/wireless network. In this case, the computer 30 stores the moving picture encoding program, the picture processing program, and the moving picture decoding program received by the communication device 24 of FIG. 13 in the memory 16, and can execute the moving picture encoding program, the picture processing program, and the moving picture decoding program by the CPU 26.

Figure 15:
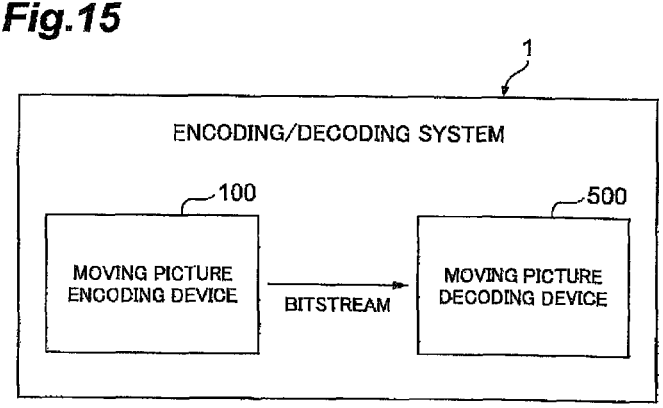
FIG. 15 is a configuration diagram of an encoding/decoding system according to the embodiment.

The invention can be embodied as an invention directed to an encoding/decoding system including the moving picture encoding device 100 (FIG. 1) including the above-described residual distorted signal removing function and the moving picture decoding device 500 (FIG. 7) including the above-described residual distorted signal removing function. As shown in FIG. 15, an encoding/decoding system 1 includes the moving picture encoding device 100 and the moving picture decoding device 500. Meanwhile, the moving picture encoding device 100 and the moving picture decoding device 500 can be connected to each other by an arbitrary communication unit, and a bitstream is transmitted from the moving picture encoding device 100 to the moving picture decoding device 500.

The invention can be embodied as an invention directed to an encoding/decoding method in the encoding/decoding system. That is, the encoding/decoding method according to the invention includes the above-described processing steps (FIG. 8) of the moving picture encoding method which is executed by the moving picture encoding device 100 and the above-described processing steps (FIG. 9) of the moving picture decoding method which is executed by the moving picture decoding device 500.

According to the embodiment described above, the effect of reducing a residual distorted signal in a filter picture while preserving the edges of a picture is obtained.

REFERENCE SIGNS LIST

1: encoding/decoding system; 10: recording medium; 12: reading device; 14: work memory; 16: memory; 18: display; 20: mouse; 22: keyboard; 24: communication device; 30: computer; 40: computer data signal; 100: moving picture encoding device; 500: moving picture decoding device; 101, 501: input terminal; 102: block divider; 103: subtracter; 104, 301: transformer; 105: quantizer; 106, 503: de-quantizer; 107, 303, 504: inverse transformer; 108: adder; 109: in-loop filter; 110, 507: frame memory; 111, 506: prediction signal generator; 112: entropy encoder; 201: first filter; 202: attribute information generator; 203: second filter; 204: filter picture selector; 302: threshold value processor; 304: combiner; 305: mask processor; 113, 508: output terminal; and 502: data analyzer.

The invention claimed is:

1. A picture processing device comprising:
a processor;
first filter circuitry executable by the processor to apply a first filter to an input picture to generate a first filter picture and filter coefficient information;
an attribute information generator executable by the processor to generate a first attribute value for each respective pixel of the first filter picture to which the first filter was applied and for which the filter coefficient information meets a predetermined criteria, and generate a second attribute value for each respective pixel in the first filter picture to which the first filter was not applied or the filter coefficient information does not meet the predetermined criteria, wherein the first and second attribute values indicate whether or not to apply a second filter to said each respective pixel of the first filter picture generated by the first filter circuitry; and
second filter circuitry executable by the processor to only apply the second filter to a target pixel of the first filter picture having the first attribute value to generate a second filter picture.

2. The picture processing device according to claim 1, further comprising:
a filter picture selector executable by the processor to: compare the first filter picture with the second filter picture to obtain a difference value of each pixel, select a pixel of the first filter picture which has the difference value equal to or greater than a predefined threshold value, select a pixel of the second filter picture which has the difference value smaller than the threshold value; and output a final filter picture that includes the selected pixel of the first filter picture and the selected pixel of the second filter picture.

3. The picture processing device according to claim 1, wherein the second filter circuitry is configured to select a target pixel of the first filter picture as a pixel of the second filter picture to be generated, in response to a value greater than a predetermined value, the predetermined value being calculated by addition of the attribute value for the target pixel of the first filter picture and the attribute value for each of a predetermined number of pixels adjacent to the target value.

4. The picture processing device according to claim 1, wherein the second filter is a one-dimensional filter, and the second filter circuitry is executable by the processor to apply the second filter to the target pixel of the first filter picture in one of a horizontal direction and a vertical direction and then executable by the processor to apply the second filter to the target pixel of the first filter picture in the other direction.

5. The picture processing device according to claim 4, wherein the second filter has 15 taps expressed by {1,1,1,1,1,1,1,2,1,1,1,1,1,1,1}/16, and the second filter circuitry is executable by the processor to apply the second filter to the target while referring to 15 pixels which include the target pixel and seven pixels located on each of the immediate left and immediate right of the target pixel or 15 pixels which include the target pixel and seven pixels located on each of the immediate top and immediate bottom of the target pixel.

6. The picture processing device according to claim 1, wherein, when the first filter is a filter which references pixels in a range surrounded by M pixels in the vicinity of a first filter target pixel, the second filter is constituted by a filter which references pixels in a range surrounded by L pixels in the vicinity of a second filter target pixel, and L is greater than M.

7. A moving picture encoding device comprising:
a block divider which divides an inputted target picture into a plurality of blocks;
a prediction signal generator which generates, for a target block, a prediction signal and side information including at least information regarding a prediction method;
a subtracter which subtracts the generated prediction signal from the signal of the target block to generate a residual signal;
a transformer which transforms the residual signal of the target block into transform coefficients in a frequency domain;
a quantizer which compresses the transform coefficients through a quantization process to obtain quantized transform coefficients;
a de-quantizer which dequantizes the quantized transform coefficients to restore transform coefficients;
an inverse transformer which inverse-transforms the restored transform coefficients to reproduce a residual signal;
an adder which adds the residual signal reproduced by the inverse transformer and the prediction signal to restore a reproduced picture;
an in-loop filter which includes the picture processing device according to claim 1 and performs a filtering process to remove an unnecessary distortion from the reproduced picture using the side information and information of the quantized transform coefficients to generate the first filter picture and determine the filter coefficient information used to generate the second filter picture;
a frame memory which stores the reproduced picture after the filtering process; and
an entropy encoder which entropy-encodes information of the quantized transform coefficients and the side information, and outputs the entropy-encoded information in the form of a bitstream.

8. A moving picture encoding method which is executed by a moving picture encoding device, the moving picture encoding method comprising the steps of:
dividing an inputted target picture into a plurality of blocks;
generating, for an encoding-target block, a prediction signal and side information including at least information regarding a prediction method;
subtracting the generated prediction signal from the signal of the target block to generate a residual signal;
transforming the residual signal of the target block to transform coefficients in a frequency domain;
compressing the transform coefficients through a quantization process to obtain quantized transform coefficients;
de-quantizing the quantized transform coefficients to restore transform coefficients;
inverse-transforming the restored transform coefficients to reproduce a residual signal;
adding the residual signal reproduced by the inverse transformer and the prediction signal to restore a reproduced picture;
operating an in-loop filter including the picture processing device according to claim 1 to perform a filtering process for removing an unnecessary distortion from the reproduced picture using the side information and information of the quantized transform coefficients to generate the first filter picture and determine the filter coefficient information used to generate the second filter picture;
storing the reproduced picture after the filtering process; and
entropy-encoding information of the quantized transform coefficients and the side information, and outputting the entropy-encoded information in the form of a bitstream.

9. A non-transitory storage medium storing a moving picture encoding program which causes a computer provided in a moving picture encoding device to function as:
a block divider which divides an inputted target picture into a plurality of blocks;
a prediction signal generator which generates, for an encoding-target block, a prediction signal and side information including at least information regarding a prediction method;
a subtracter which subtracts the generated prediction signal from the signal of the target block to generate a residual signal;
a transformer which transforms the residual signal of the target block to transform coefficients in a frequency domain;
a quantizer which compresses the transform coefficients through a quantization process to obtain quantized transform coefficients;
a de-quantizer which de-quantizes the quantized transform coefficients to restore transform coefficients;
an inverse transformer which inverse-transforms the restored transform coefficients to reproduce a residual signal;
an adder which adds the residual signal reproduced by the inverse transformer and the prediction signal to restore a reproduced picture;
an in-loop filter which includes the picture processing device according to claim 1 and performs a filtering process for removing an unnecessary distortion from the reproduced picture using the side information and information of the quantized transform coefficients to generate the first filter picture and determine the filter coefficient information used to generate the second filter picture;
a frame memory which stores the reproduced picture after the filtering process; and
an entropy encoder which entropy-encodes information of the quantized transform coefficients and the side information, and outputs the entropy-encoded information in the form of a bitstream.

10. A moving picture decoding device comprising:
a data analyzer which receives a bitstream obtained by entropy-encoding quantized transform coefficients of a residual signal and side information including at least information regarding a prediction method and entropy-decodes the bitstream to obtain the quantized transform coefficients and the side information;
a prediction signal generator which generates a prediction signal on the basis of the side information;
a de-quantizer which dequantizes the quantized transform coefficients to obtain transform coefficients;

an inverse transformer which inverse-transforms the transform coefficients to restore a residual signal;

an adder which adds the prediction signal and the residual signal to generate a reproduced picture;

an in-loop filter which includes the picture processing device according to claim 1 and performs a filtering process for removing an unnecessary distortion from the reproduced picture using the side information and information of the quantized transform coefficients to generate the first filter picture and determine the filter coefficient information used to generate the second filter picture; and a frame memory which stores the reproduced picture after the filtering process.

11. A moving picture decoding method which is executed by a moving picture decoding device, the moving picture decoding method comprising the steps of:

receiving a bitstream obtained by entropy-encoding quantized transform coefficients of a residual signal and side information including at least information regarding a prediction method and entropy-decoding the bitstream to obtain the quantized transform coefficients and the side information;

generating a prediction signal on the basis of the side information;

de-quantizing the quantized transform coefficients to obtain transform coefficients;

inverse-transforming the transform coefficients to restore a residual signal;

adding the prediction signal and the residual signal to generate a reproduced picture;

operating an in-loop filter including the picture processing device according to claim 1 to perform a filtering process for removing an unnecessary distortion from the reproduced picture using the side information and information of the quantized transform coefficients to generate the first filter picture and determine the filter coefficient information used to generate the second filter picture; and storing the reproduced picture after the filtering process.

12. A non-transitory storage medium storing a moving picture decoding program which causes a computer provided in a moving picture decoding device to function as:

a data analyzer which receives a bitstream obtained by entropy-encoding quantized transform coefficients of a residual signal and side information including at least information regarding a prediction method and entropy-decodes the bitstream to obtain the quantized transform coefficients and the side information;

a prediction signal generator which generates a prediction signal on the basis of the side information;

a dequantizer which dequantizes the quantized transform coefficients to obtain transform coefficients;

an inverse transformer which inverse-transforms the transform coefficients to restore a residual signal;

an adder which adds the prediction signal and the residual signal to generate a reproduced picture;

an in-loop filter which includes the picture processing device according to claim 1 and performs a filtering process for removing an unnecessary distortion from the reproduced picture using the side information and information of the quantized transform coefficients to generate the first filter picture and determine the filter coefficient information used to generate the second filter picture; and a frame memory which stores the reproduced picture after the filtering process.

13. An encoding/decoding system comprising:

a moving picture encoding device; and a moving picture decoding device, wherein the moving picture encoding device includes a block divider which divides an input encoding-target picture into a plurality of blocks, a prediction signal generator which generates, for an encoding-target block, a prediction signal and side information including at least information regarding a prediction method, a subtracter which subtracts the generated prediction signal from the signal of the target block to generate a residual signal, a transformer which transforms the residual signal of the target block to transform coefficients in a frequency domain, a quantizer which compresses the transform coefficients through a quantization process to obtain quantized transform coefficients, a de-quantizer which dequantizes the quantized transform coefficients to restore transform coefficients, an inverse transformer which inverse-transforms the restored transform coefficients to reproduce a residual signal, an adder which adds the residual signal reproduced by the inverse transformer and the prediction signal to restore a reproduced picture, an in-loop filter which includes the picture processing device according to claim 1 and performs a filtering process for removing an unnecessary distortion from the reproduced picture using the side information and information of the quantized transform coefficients to generate the first filter picture and determine the filter coefficient information used to generate the second filter picture, a frame memory which stores the reproduced picture after the filtering process, and an entropy encoder which entropy-encodes information of the quantized transform coefficients and the side information, and outputs the entropy-encoded information in the form of a bitstream, and the moving picture decoding device includes a data analyzer which receives a bitstream obtained by entropy-encoding quantized transform coefficients of a residual signal and side information including at least information regarding a prediction method and entropy-decodes the bitstream to obtain the quantized transform coefficients and the side information, a prediction signal generator which generates a prediction signal on the basis of the side information, a dequantizer which dequantizes the quantized transform coefficients to obtain transform coefficients, an inverse transformer which inverse-transforms the obtained transform coefficients to restore a residual signal, an adder which adds the prediction signal and the residual signal to generate a reproduced picture, an in-loop filter which includes the picture processing device according to claim 1 and performs a filter process for removing an unnecessary distortion from the reproduced picture using the side information and information of the quantized transform coefficients to generate the first filter picture and determine the filter coefficient information used to generate the second filter picture, and a frame memory which stores the reproduced picture after the filtering process.

14. An encoding/decoding method which is executed in an encoding/decoding system including a moving picture encoding device and a moving picture decoding device, the encoding/decoding method comprising the steps of:
  processing a moving picture encoding method which is executed by the moving picture encoding device; and
  processing a moving picture decoding method which is executed by the moving picture decoding device,
  wherein the step of processing the moving picture encoding method includes the steps of
  dividing an input encoding-target picture into a plurality of blocks,
  generating, for an encoding-target block, a prediction signal and side information including at least information regarding a prediction method,
  subtracting the generated prediction signal from the signal of the target block to generate a residual signal,
  transforming the residual signal of the target block to transform coefficients in a frequency domain,
  compressing the transform coefficients through a quantization process to obtain quantized transform coefficients,
  dequantizing the quantized transform coefficients to restore transform coefficients,
  inverse-transforming the restored transform coefficients to reproduce a residual signal,
  adding the residual signal reproduced by the inverse transformer and the prediction signal to restore a reproduced picture,
  operating an in-loop filter including the picture processing device according to claim 1 to perform a filtering process for removing an unnecessary distortion from the reproduced picture using the side information and information of the quantized transform coefficients to generate the first filter picture and determine the filter coefficient information used to generate the second filter picture,
  storing the reproduced picture after the filtering process, and
  entropy-encoding information of the quantized transform coefficients and the side information, and outputting the entropy-encoded information in the form of a bitstream, and
  the step of processing the moving picture decoding method includes the steps of
  receiving a bitstream obtained by entropy-encoding quantized transform coefficients of a residual signal and side information including at least information regarding a prediction method and entropy-decoding the bitstream to obtain the quantized transform coefficients and the side information,
  generating a prediction signal on the basis of the side information,
  de-quantizing the quantized transform coefficients to obtain transform coefficients,
  inverse-transforming the obtained transform coefficients to restore a residual signal,
  adding the prediction signal and the residual signal to generate a reproduced picture,
  operating an in-loop filter including the picture processing device according to claim 1 to perform a filtering process for removing an unnecessary distortion from the reproduced picture using the side information and information of the quantized transform coefficients to generate the first filter picture and determine the filter coefficient information used to generate the second filter picture, and
  storing the reproduced picture after the filtering process.

15. The picture processing device according to claim 1, wherein the attribute information generator generates the first attribute value to indicate that the second filter should be applied to the target pixel in response to determination by the attribute information generator that the filter coefficient information comprising a quantity of coefficients related to the target pixel meet the predetermined criteria of having a value below a threshold value, and being equal to or greater than a predetermined number.

16. The picture processing device according to claim 15, wherein the value of each of the coefficients is determined by the first filter circuitry using frequency transform of a reference picture.

17. The picture processing device according to claim 1, wherein the second filter is applied to only those pixels which are indicated with respective attribute values that the second filter is to be applied.

18. A moving picture decoding device comprising:
  a data analyzer which receives a bitstream obtained by entropy-encoding quantized transform coefficients of a residual signal and side information including at least information regarding a prediction method and entropy-decodes the bitstream to obtain the quantized transform coefficients and the side information;
  a prediction signal generator which generates a prediction signal on the basis of the side information;
  a dequantizer which dequantizes the quantized transform coefficients to obtain transform coefficients;
  an inverse transformer which inverse-transforms the transform coefficients to restore a residual signal;
  an adder which adds the prediction signal and the residual signal to generate a reproduced picture;
  an in-loop filter which includes the picture processing device according to claim 2 and performs a filtering process for removing an unnecessary distortion from the reproduced picture using the side information and information of the quantized transform coefficients to generate the first filter picture and determine the filter coefficient information used to generate the second filter picture; and
  a frame memory which stores the final filter picture as the reproduced picture after the filtering process.

19. A moving picture decoding method which is executed by a moving picture decoding device, the moving picture decoding method comprising the steps of:
  receiving a bitstream obtained by entropy-encoding quantized transform coefficients of a residual signal and side information including at least information regarding a prediction method and entropy-decoding the bitstream to obtain the quantized transform coefficients and the side information;
  generating a prediction signal on the basis of the side information;
  de-quantizing the quantized transform coefficients to obtain transform coefficients;
  inverse-transforming the transform coefficients to restore a residual signal;
  adding the prediction signal and the residual signal to generate a reproduced picture;
  operating an in-loop filter including the picture processing device according to claim 2 to perform a filtering process for removing an unnecessary distortion from the reproduced picture using the side information and information of the quantized transform coefficients to generate the first filter picture and determine the filter coefficient information used to generate the second filter picture; and storing the final filter picture as the reproduced picture after the filtering process.

20. A picture processing method which is executed by a picture processing device, the picture processing method comprising:
- a first filtering step of applying a first filter to an input target picture to remove distortion near an edge of the input picture and generate a first filter picture and filter coefficient information;
- an attribute information generation step of generating an attribute value for each respective pixel of the first picture filter, a first attribute value indicating the first filter was applied and the filter coefficient information meets a predetermined criteria for the respective pixel, and a second attribute value indicating the first filter was not applied or the filter coefficient does not meet the predetermined criteria for the respective pixel; and
- a second filter step of only applying the second filter to a target pixel of the first filter picture to generate a second filter picture, when the target pixel is indicated as having the first attribute.

21. The picture processing method according to claim 20, further comprising:
- a filter picture selection step of comparing the first filter picture with the second filter picture to obtain a difference value of each pixel, selecting a pixel of the first filter picture which has the difference value equal to or greater than a predefined threshold value, selecting a pixel of the second filter picture which has the difference value smaller than the threshold value, and outputting a final filter picture that includes the selected pixel of the first filter pixel and the selected pixel of the second filter pixel.

22. A non-transitory storage medium storing a picture processing program which causes a computer provided in a picture processing device to function as:
- first filter circuitry that applies a first filter to an input picture to generate a first filter picture and filter coefficient information;
- an attribute information generator that generates an attribute value for each respective pixel of the first filter picture, a first attribute value generated for a respective pixel to indicate the respective pixel was filtered by the first filter circuitry and that the filter coefficient information meets a predetermined criteria, and a second attribute value generated for a respective pixel to indicate the respective pixel was not filtered by the first filter or the filter coefficient information does not meet the predetermined criteria; and
- second filter circuitry that applies the second filter to a target pixel of the first filter picture to generate a second filter picture only when the target pixel includes the first attribute value.

23. The storage medium according to claim 22, further storing a program causing the computer to further function as:
- a filter picture selector that compares the first filter picture with the second filter picture to obtain a difference value of each pixel, selects a pixel of the first filter picture which has the difference value equal to or greater than a predefined threshold value, selects the pixel of the second filter picture which has the difference value smaller than the threshold value, and outputs a final filter picture that includes the selected pixel of the first filter picture and the selected pixel of the second filter picture.

* * * * *

UNITED STATES PATENT AND TRADEMARK OFFICE
CERTIFICATE OF CORRECTION

Page 1 of 1

PATENT NO.         : 9,167,271 B2
APPLICATION NO.    : 13/081326
DATED              : October 20, 2015
INVENTOR(S)        : Yoshinori Suzuki et al.

It is certified that error appears in the above-identified patent and that said Letters Patent is hereby corrected as shown below:

In the Claims:

In Column 22, lines 63 and 64, delete "{1,1,1,1,1,1,1,2,1,1,1,1}/16" and insert
--{1,1,1,1,1,1,1,2,1,1,1,1,1,1}/16--

Signed and Sealed this
Fifth Day of April, 2016

Michelle K. Lee
*Director of the United States Patent and Trademark Office*